United States Patent
Zhu et al.

(10) Patent No.: US 12,032,952 B2
(45) Date of Patent: Jul. 9, 2024

(54) SERVICE UPGRADE METHOD, APPARATUS, AND SYSTEM

(71) Applicant: Huawei Technologies Co., Ltd., Shenzhen (CN)

(72) Inventors: Jianguo Zhu, Dongguan (CN); Wei Tong, Shenzhen (CN); Xinliang Qin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 17/852,930

(22) Filed: Jun. 29, 2022

(65) Prior Publication Data

US 2022/0326940 A1 Oct. 13, 2022

Related U.S. Application Data

(63) Continuation of application No. PCT/CN2020/140629, filed on Dec. 29, 2020.

(30) Foreign Application Priority Data

Dec. 31, 2019 (CN) .......................... 201911410720.4

(51) Int. Cl.
G06F 9/44 (2018.01)
G06F 8/656 (2018.01)
H04L 41/0823 (2022.01)

(52) U.S. Cl.
CPC .......... *G06F 8/656* (2018.02); *H04L 41/0823* (2013.01)

(58) Field of Classification Search
CPC ............................. G06F 8/656; H04L 41/0823
See application file for complete search history.

(56) References Cited

U.S. PATENT DOCUMENTS

| 10,419,469 | B1* | 9/2019 | Singh | .................... H04L 67/535 |
| 2008/0215758 | A1* | 9/2008 | Gerdes | ...................... G06F 8/65 709/248 |
| 2016/0048384 | A1* | 2/2016 | Fan | .......................... G06F 8/65 717/171 |
| 2016/0360011 | A1* | 12/2016 | Mihara | ............... G06F 9/44536 |
| 2017/0286092 | A1* | 10/2017 | Zhu | ......................... G06F 8/654 |
| 2018/0219971 | A1 | 8/2018 | Chen | |

(Continued)

FOREIGN PATENT DOCUMENTS

| CN | 106789202 A | 5/2017 |
| CN | 108319468 A | 7/2018 |
| CN | 108595207 A | 9/2018 |

(Continued)

*Primary Examiner* — Hang Pan
(74) *Attorney, Agent, or Firm* — Conley Rose, P.C.

(57) ABSTRACT

A method includes adding, by a first apparatus, a first node to the first apparatus, where the first apparatus is configured to store and manage service-related data, and where the first node is configured to perform a grayscale upgrade on a first service; configuring, by the first apparatus, a grayscale rule; identifying, by the first apparatus and according to the grayscale rule, a grayscale user to test the first service; sending, by the first apparatus to a second apparatus, the grayscale rule, wherein the second apparatus is a front-end apparatus of the first apparatus; and performing, by the first node, the grayscale upgrade on the first service of the grayscale user.

18 Claims, 4 Drawing Sheets

(56) References Cited

U.S. PATENT DOCUMENTS

2021/0011834 A1   1/2021  You et al.
2021/0048999 A1*  2/2021  Bregman .................. G06F 8/65

FOREIGN PATENT DOCUMENTS

| CN | 109474522 A | 3/2019 |
| --- | --- | --- |
| CN | 110162382 A | 8/2019 |
| CN | 110365502 A | 10/2019 |

* cited by examiner

SERVICE UPGRADE METHOD, APPARATUS, AND SYSTEM

CROSS-REFERENCE TO RELATED APPLICATIONS

This disclosure is a continuation of International Patent Application No. PCT/CN2020/140629 filed on Dec. 29, 2020, which claims priority to Chinese Patent Application No. 201911410720.4 filed on Dec. 31, 2019. The disclosures of the aforementioned applications are hereby incorporated by reference in their entireties.

TECHNICAL FIELD

The present disclosure relates to wireless communication technologies, and in particular, to a service upgrade method, an apparatus, and a system.

BACKGROUND

Rich services and diversified user requirements such as an ultra-high-definition video, virtual reality (VR)/augmented reality (AR), self-driving, and Internet of things (IoT) attract many operators and users. Whether a product can be quickly delivered and whether a new service can be quickly upgraded and put online becomes an important concern. Existing hitless upgrade (in an upgrade process, an entire system is divided into two planes, and a plane 0 is upgraded before a plane 1) may ensure that a service is not interrupted in the upgrade process. However, an error in the upgrade process cannot be identified in advance. Once a problem occurs during upgrade, all users in an entire office are affected, and the entire upgrade process needs to be fully rolled back. In addition, the existing upgrade manner cannot support quick deployment and online verification of the new service. The new service can be verified only after full upgrade.

SUMMARY

Embodiments of the present disclosure provide a service upgrade method, an apparatus, and a system, to reduce service upgrade costs and improve service reliability.

According to a first aspect, an embodiment of this disclosure provides a service upgrade method. The method includes that a first node is added to a first apparatus, where the first apparatus is configured to store service-related data, and the first node is configured to perform grayscale upgrade on a first service, the first apparatus configures a grayscale rule, where the first apparatus identifies a grayscale user according to the grayscale rule, and the grayscale user is used to test the first service, the first apparatus sends the grayscale rule to a second apparatus, where the second apparatus is a front-end apparatus of the first apparatus, and the first node performs grayscale upgrade on the first service.

Based on the method in the first aspect, grayscale upgrade and verification are performed on the first service by using a small quantity of grayscale users. The first apparatus and the second apparatus can synchronize the grayscale rule, and identify the grayscale user, so that a test of the first service of the grayscale user can cover the first apparatus and the second apparatus. This implements end-to-end test coverage after grayscale upgrade, improves a possibility of finding a problem in a grayscale upgrade phase, reduces a possibility of rollback caused by a service upgrade failure, and reduces service upgrade costs.

In an optional design, the first apparatus includes at least one second node, where the second node is configured to store or manage user data. After performing grayscale upgrade on the first service, the first node tests the first service of the grayscale user. After the test is passed, the at least one second node performs rolling upgrade on the first service. After the grayscale upgrade succeeds, rolling upgrade is performed. This can reduce a quantity of users affected in an upgrade process, and improve service reliability.

In an optional design, the method further includes deleting the first node from the first apparatus.

In an optional design, before the first node performs grayscale upgrade on the first service, data of the grayscale user is copied to the first node.

In an optional design, before the first node deletes the first node from the first apparatus, the data of the grayscale user on the first node is synchronized to an original node, where the original node is a node on which the data of the grayscale user is located before the data of the grayscale user is copied to the first node.

In an optional design, the first node is a docker in docker (DID) container or a process identifier (ID) (PID) container.

In an optional design, that the first apparatus identifies a grayscale user according to the grayscale rule includes that a load balancing (LB) node of the first apparatus identifies the grayscale user according to the grayscale rule.

In an optional design, the first apparatus is a unified data repository (UDR).

In an optional design, the second apparatus is a unified data management (UDM) network element. Alternatively, the second apparatus is a policy control function (PCF) network element.

According to a second aspect, an embodiment of this disclosure provides a service upgrade method, where the method includes that a second apparatus receives a grayscale rule from a first apparatus, where the first apparatus is configured to store service data, and the second apparatus is a front-end apparatus of the first apparatus, and the second apparatus identifies a grayscale user according to the grayscale rule, where the grayscale user is used to test a first service on which grayscale upgrade is performed.

Based on the method in the second aspect, the first apparatus and the second apparatus can synchronize the grayscale rule, and identify the grayscale user, so that a test of the first service of the grayscale user can cover the first apparatus and the second apparatus. This implements end-to-end test coverage after grayscale upgrade, improves a possibility of finding a problem in a grayscale upgrade phase, reduces a possibility of rollback caused by a service upgrade failure, and reduces service upgrade costs.

In an optional design, the second apparatus is used by the grayscale user to access a later-version application (APP), and the later-version app obtains data of the first service from the first apparatus.

In an optional design, that the second apparatus identifies a grayscale user according to the grayscale rule includes that an LB node of the second apparatus identifies the grayscale user according to the grayscale rule.

In an optional design, the first apparatus is a UDR.

In an optional design, the second apparatus is a UDM network element. Alternatively, the second apparatus is a PCF network element.

According to a third aspect, an embodiment of this disclosure provides a communication apparatus configured to implement the communication apparatus in the first aspect. The communication apparatus in the third aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to a fourth aspect, an embodiment of this disclosure provides a communication apparatus configured to implement the communication apparatus in the second aspect. The communication apparatus in the fourth aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to a fifth aspect, an embodiment of this disclosure provides a communication apparatus, including a processor. The processor is configured to read instructions from a memory, and run the instructions to implement the method in the first aspect. Optionally, the communication apparatus includes the memory. Optionally, the communication apparatus may be a chip.

According to a sixth aspect, an embodiment of this disclosure provides a communication apparatus, including a processor. The processor is configured to read instructions from a memory, and run the instructions to implement the method in the second aspect. Optionally, the communication apparatus includes the memory. Optionally, the communication apparatus may be a chip.

According to a seventh aspect, an embodiment of this disclosure provides a computer-readable storage medium, including instructions. When the instructions are executed on a communication apparatus, the communication apparatus is enabled to implement any one of the foregoing methods.

According to an eighth aspect, an embodiment of this disclosure provides a computer program product, including instructions. When the instructions are executed on a communication apparatus, the communication apparatus is enabled to implement any one of the foregoing methods.

According to a ninth aspect, an embodiment of this disclosure provides a communication system, including the third aspect or the fifth aspect. Optionally, the communication system further includes the communication apparatus in the fourth aspect or the sixth aspect.

In the solutions of this disclosure, grayscale upgrade and verification are performed on the first service by using a small quantity of grayscale users. In addition, this can implement end-to-end test coverage after grayscale upgrade, improve a possibility of finding a problem in a grayscale upgrade phase, reduce a possibility of rollback caused by a service upgrade failure, and reduce service upgrade costs. After the grayscale upgrade succeeds, rolling upgrade is performed. This reduces a quantity of users affected in an upgrade process, and improves service reliability.

DESCRIPTION OF EMBODIMENTS

To make the purpose, technical solutions, and advantages of embodiments of this disclosure clearer, the following clearly and completely describes the technical solutions of embodiments of this disclosure with reference to the accompanying drawings in embodiments of this disclosure.

In the specification, claims, and accompanying drawings of this disclosure, the terms "first", "second", and so on are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. Division into the modules in this disclosure is merely logical division, and there may be another division during implementation in actual application. For example, multiple modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this disclosure. In addition, modules or sub-modules described as separate components may be or may not be physically separated, or may be or may not be physical modules, or may not be grouped into multiple circuit modules. Objectives of the solutions of this disclosure may be achieved by selecting some or all of the modules according to actual requirements.

Figure 1:
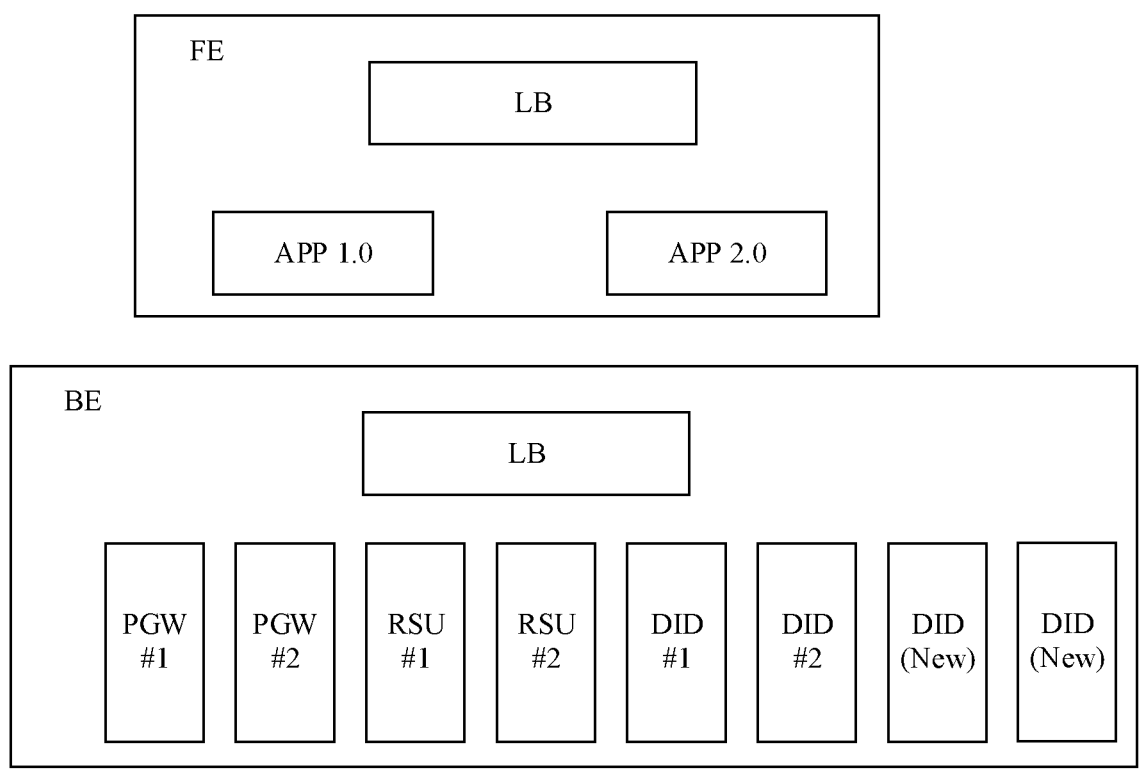
FIG. 1 is a schematic diagram of a structure of a communication device according to an embodiment of this disclosure.

FIG. 1 is a schematic diagram of a structure of a communication device according to an embodiment of this disclosure. The communication device includes a service node (front end (FE)) and a data node (back end (BE)).

Further, the FE is configured to process a service, and the BE is configured to store user data or service data. The BE may provide a function such as data storage, data management, and a data service for the FE. In a service processing process of the FE, data can be read and stored by using the BE.

The FE may include an LB node, and the LB node is configured to perform load balancing processing. An APP may be deployed on the FE, and the APP is used to process a service. The BE may include an LB node, and a plurality of provisioning gateway (PGW) containers, a plurality of routing switch unit (RSU) containers, and a plurality of DID containers. The PGW container is used to process a service. The RSU container is used to store user data. The DID container may be used to process a service and store user data. The foregoing container may be another container or virtual machine used to store or manage data. This is not limited in this embodiment of this disclosure.

It may be understood that the communication device may be a device entity, and the device entity is integrated with the FE and the BE. Alternatively, the communication device may include an FE and a BE that are deployed in a distributed manner.

Fifth generation (5G) is used as an example. The FE part may be a UDM network element, or the FE part may be a PCF network element. The BE part may be a UDR network element.

The UDM network element is a network element used for data management. The network element is mainly used for generating an authentication parameter, storing and managing an ID of a permanent user in a system, and performing registration management on network elements serving the user, for example, an access management function (AMF) and a session management function (SMF) that currently provide a service for a terminal device.

The PCF network element is a network element used for policy control. The network element is mainly used for providing a unified policy framework to manage network behavior and providing a policy rule for a control layer network function, and is responsible for obtaining policy-related subscription information of a subscriber.

The UDR network element is a network element used for unified data storage. The network element is mainly used to store and retrieve subscription data, policy data, and common architecture data, and provide related data for the UDM network element or the PCF network element.

To implement a requirement of quickly delivering a product and quickly upgrading and putting a new service online, the communication device needs to perform service upgrade without service interruption. In an existing upgrade manner, the new service can be verified only after full upgrade. If a problem occurs in an upgrade process, the entire upgrade process needs to be fully rolled back, and service upgrade costs and a service upgrade failure rate are high. In view of this, the embodiments of this disclosure provide a service upgrade method, to reduce service upgrade costs and improve a service upgrade success rate.

Figure 2:
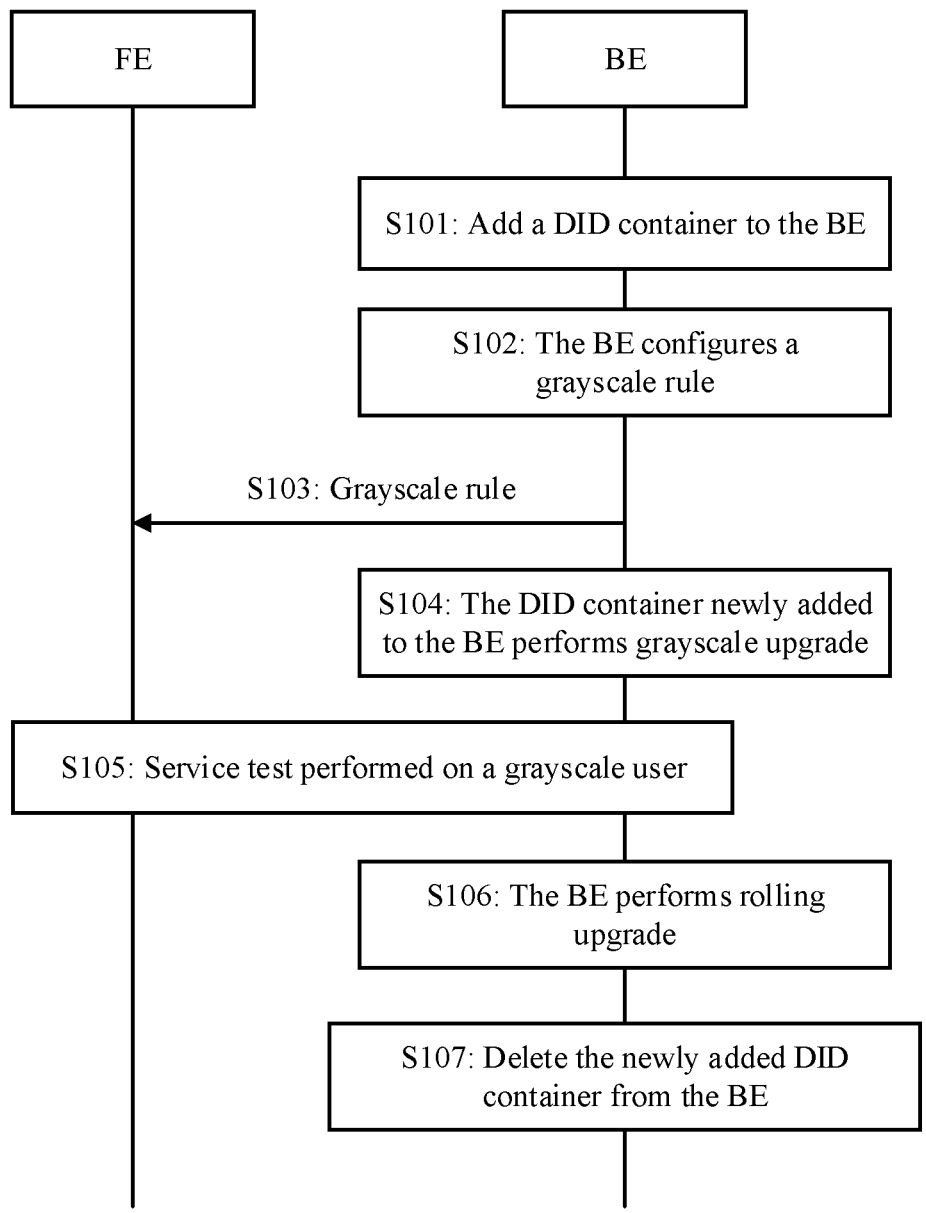
FIG. 2 is a schematic flowchart of a service upgrade method according to an embodiment of this disclosure.
Figure 3:
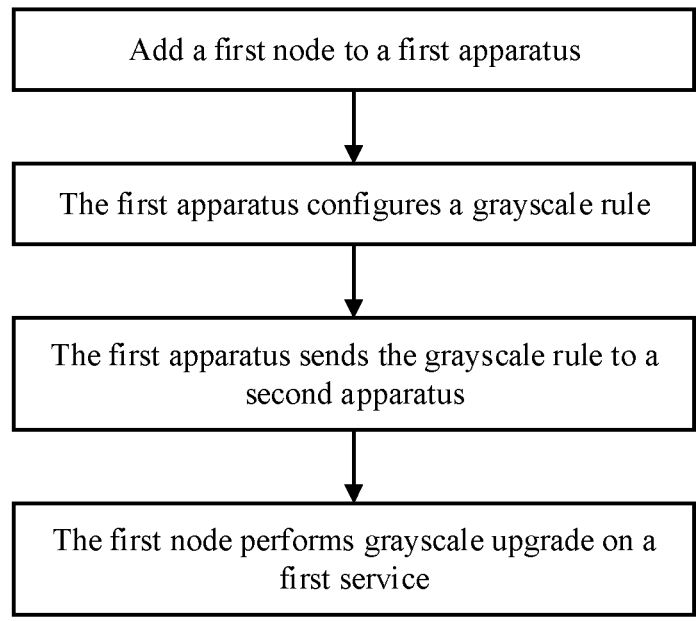
FIG. 3 is a schematic flowchart of another service upgrade method according to an embodiment of this disclosure.
Figure 4:
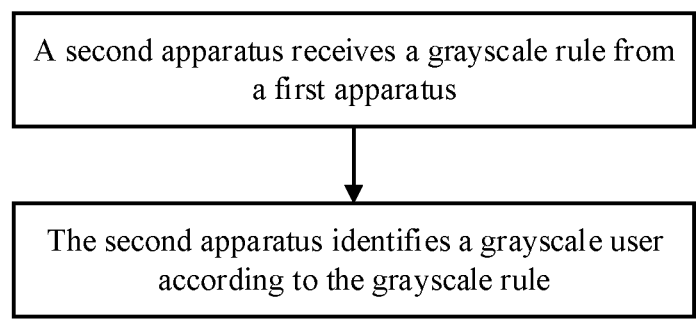
FIG. 4 is a schematic flowchart of still another service upgrade method according to an embodiment of this disclosure.

With reference to FIG. 2 to FIG. 4, the following describes the service upgrade method provided in the embodiments of this disclosure.

FIG. 2 is a schematic flowchart of a service upgrade method according to an embodiment of this disclosure. The method is used to upgrade a first service. In the method, a virtual machine or a container used for grayscale upgrade is added to a BE part. In the method, an FE part and the BE part further synchronize a grayscale rule, so that grayscale upgrade can be cooperatively performed for a grayscale user at the FE part and the BE part, and full-process verification can be performed for service upgrade. In the method, after the verification succeeds, rolling upgrade is performed, to reduce a range of users affected in the upgrade process.

Grayscale upgrade in the method is a smooth service upgrade manner. Grayscale upgrade may also be referred to as grayscale release or canary release. An AB test is a grayscale upgrade manner in which some users are enabled to continue to use A while the other users start to use B, and if the users have no objection to B, the scope is gradually expanded such that all users are migrated to B. Some users who start to use B may be understood as grayscale users. A problem may be found and adjusted in an initial service upgrade phase through grayscale upgrade.

In the method, rolling upgrade means performing service upgrade on one or more nodes each time, and then adding, to a production environment, a node on which upgrade is completed. The process is continuously executed until upgrade is completed for all nodes in the production environment. Rolling upgrade may also be referred to as rolling release.

As shown in FIG. 2, the method includes the following steps.

S101: Add a DID container to the BE.

The DID container is used to perform grayscale upgrade on a first service. Optionally, a PGW module, a data service gateway (DSG) module, a data routing unit (DRU) module, and a data service unit (DSU) module are deployed in the DID container. The PGW module may be configured to process a service, the DSG module may be configured to forward a message, the DRU module may be configured to store routing data, and the DSU module may be configured to store user data.

Further, service data that is of the first service and that is in a current version and data of a grayscale user are stored in the newly added DID container. The grayscale user is a user used to perform a grayscale upgrade test. In an optional implementation, the service data that is of the first service and that is in the current version and the data of the grayscale user may be copied from a PGW container and an RSU container of the BE to the newly added DID container. In an example, a real user who uses the foregoing service may be invited to participate in the test, and a real user who agrees to participate in the test is used as a grayscale user. In another example, a test user may be set for the foregoing service. The test user is used to perform a service test. The test user may be maintained by a developer or a test person, and the test user is used as a grayscale user.

Optionally, the DID container may be another virtual machine or container that can be used to perform grayscale upgrade, for example, a PID container. This is not limited in this embodiment of this disclosure.

Optionally, in S101, a pair of DID containers or a pair of PID containers may be added to the BE, to avoid service interruption caused when one of the DID containers or one of the PID containers is faulty.

Optionally, S101 may be performed at any moment before S104. This is not limited in this embodiment of this disclosure.

S102: The BE configures a grayscale rule.

The grayscale rule includes information about the grayscale user. The BE part may identify the grayscale user according to the grayscale rule.

Optionally, a local maintenance terminal (local portal) configures and delivers the grayscale rule. The local portal may be a server or a server-side system in the BE, and may be configured to provide a function such as a portal service and client authentication.

Optionally, the grayscale rule may include one or more hash values, and one hash value may be used to identify one grayscale user.

S103: The BE sends the grayscale rule to the FE.

The FE may identify the grayscale user according to the grayscale rule.

In a possible implementation, an LB node of the BE sends the grayscale rule to an LB node of the FE.

In a possible implementation, the BE sends the grayscale rule to the FE through a synchronization interface between the BE and the FE.

S104: The DID container newly added to the BE performs grayscale upgrade.

Further, the grayscale rule is imported into the BE. The BE copies the service data, that is of the first service and that is in the current version and the data of the grayscale user, from the PGW container and the RSU container to the newly added DID container, upgrades the first service in the newly added DID container, and updates the service data and the data of the grayscale user in the newly added DID container.

S105: Perform a service test on the grayscale user.

Further, an APP 1.0 that is of the first service and that is in a current version and an APP2.0 that is of the first service and that is in an upgrade version are deployed on the FE.

Further, the grayscale user accesses the first service by using the LB node of the FE. After identifying the grayscale user according to the grayscale rule, the LB node of the FE part distributes the grayscale user to the APP 2.0. The APP 2.0 processes the service, and sends a service request to the LB node of the BE part. After identifying, according to the grayscale rule, the grayscale user corresponding to the service request, the LB node of the BE part forwards the service request to the newly added DID container for processing. After completing processing, the DID container feeds back a response message to the LB node of the BE. The LB node of the BE part feeds back the response message to the APP 2.0. The APP 2.0 feeds back the response message to the LB node of the FE part. The grayscale user may determine, based on the response message, whether the upgraded first service passes the test.

S106: The BE performs rolling upgrade.

Further, after the grayscale test is passed, rolling upgrade is performed on another container or virtual machine of the BE.

That the grayscale test is passed may be as follows. All grayscale users pass the test in S105, or a user who has participated in the service test in S105 in grayscale users passes the test. This is not limited in this embodiment of this disclosure.

In a possible implementation, rolling upgrade performed by the BE part may be upgrading one or more PGW containers. After the upgrade succeeds, one or more RSU containers are upgraded.

Optionally, in the rolling upgrade process, if one or more containers fail to be upgraded, rollback is performed.

S107: Delete the newly added DID container from the BE.

Further, after the data of the grayscale user in the DID container is synchronized to the RSU container or the PGW container in which the grayscale user is located before the grayscale user is copied to the DID container, the DID container is deleted from the BE.

In the foregoing S101, S104, and S106, grayscale upgrade and verification are performed on the first service by using a small quantity of grayscale users. This improves a possibility of finding a problem in a grayscale upgrade phase, reduces a possibility of rollback caused by a service upgrade failure, and reduces service upgrade costs. After the grayscale upgrade succeeds, rolling upgrade is performed. This reduces a quantity of users affected in an upgrade process, and improves service reliability.

In addition, in the foregoing S102, S103, and S105, the FE part and the BE part can synchronize the grayscale rule, and identify the grayscale user, so that a test of the first service of the grayscale user can cover the FE part and the BE part. This implements end-to-end test coverage after grayscale upgrade, improves a possibility of finding a problem in a grayscale test phase, reduces a possibility that a problem occurs in a subsequent rolling upgrade phase, reduces a rollback possibility, and reduces service upgrade costs.

FIG. 3 is a schematic flowchart of a service upgrade method according to an embodiment of this disclosure. The method is used to upgrade a first service. As shown in FIG. 3, the method includes the following steps.

S201: Add a first node to a first apparatus.

The first apparatus is configured to store and manage service-related data, and the first node is configured to perform grayscale upgrade on the first service. The first apparatus may be the BE in FIG. 2. The first node may be the newly added DID container or PID container in S101. For details, refer to content in S101.

S202: The first apparatus configures a grayscale rule.

The first apparatus identifies a grayscale user according to the grayscale rule, and the grayscale user is used to test the first service. For details, refer to content in S102.

S203: The first apparatus sends the grayscale rule to a second apparatus.

The second apparatus is a front-end apparatus of the first apparatus. The front-end apparatus may be understood as follows. A user accesses a service by using the first apparatus, and the second apparatus provides the first apparatus with data required by the service. The second apparatus may be the FE in FIG. 2. For details, refer to content in S103.

S204: The first node performs grayscale upgrade on the first service.

For details, refer to content in S104.

Optionally, the first apparatus includes at least one second node, where the second node is configured to store or manage user data. After performing grayscale upgrade on the first service, the first node tests the first service of the grayscale user. After the test is passed, the at least one second node performs rolling upgrade on the first service. The second node may be the PGW container, the RSU container, or a non-newly added DID container in FIG. 2. For details of the foregoing process, refer to content in S105 and S106.

Optionally, the first node is deleted from the first apparatus. For details, refer to content in S107.

Optionally, before the first node performs grayscale upgrade on the first service, data of the grayscale user is copied to the first node. For details, refer to content in S104.

Optionally, before the first node deletes the first node from the first apparatus, the data of the grayscale user on the first node is synchronized to an original node, where the original node is a node on which the data of the grayscale user is located before the data of the grayscale user is copied to the first node. For details, refer to content in S107.

Optionally, that the first apparatus identifies a grayscale user according to the grayscale rule includes that an LB node of the first apparatus identifies the grayscale user according to the grayscale rule. For details, refer to content in S102.

Optionally, the first apparatus is a UDR. For details, refer to the descriptions of the BE in FIG. 1.

Optionally, the second apparatus is a UDM network element. Alternatively, the second apparatus is a PCF network element. For details, refer to the descriptions of the FE in FIG. 1.

Based on the foregoing method, grayscale upgrade and verification are performed on the first service by using a small quantity of grayscale users. This improves a possibility of finding a problem in a grayscale upgrade phase, reduces a possibility of rollback caused by a service upgrade failure, and reduces service upgrade costs. After the grayscale upgrade succeeds, rolling upgrade is performed. This reduces a quantity of users affected in an upgrade process, and improves service reliability. In addition, the first apparatus and the second apparatus can synchronize the grayscale rule, and identify the grayscale user, so that a test of the first service of the grayscale user can cover the first apparatus and the second apparatus. This implements end-to-end test coverage after grayscale upgrade, improves a possibility of finding a problem in a grayscale test phase, reduces a possibility that a problem occurs in a subsequent rolling upgrade phase, reduces a rollback possibility, and reduces service upgrade costs.

FIG. 4 is a schematic flowchart of a service upgrade method according to an embodiment of this disclosure. The method is used to upgrade a first service. As shown in FIG. 4, the method includes the following steps.

S301: A second apparatus receives a grayscale rule from a first apparatus.

The first apparatus is configured to store and manage service data, and the second apparatus is a front-end apparatus of the first apparatus. The first apparatus may be the BE in FIG. 2. The second apparatus may be the FE in FIG. 2.

S302: The second apparatus identifies a grayscale user according to the grayscale rule.

The grayscale user is used to test the first service on which grayscale upgrade is performed. For details, refer to content in S104.

Optionally, the second apparatus is used by the grayscale user to access a later-version APP, and the later-version app obtains data of the first service from the first apparatus. For details, refer to content in S105.

Optionally, that the second apparatus identifies a grayscale user according to the grayscale rule includes that an LB node of the second apparatus identifies the grayscale user according to the grayscale rule. For details, refer to content in S103.

Optionally, the first apparatus is a UDR. For details, refer to the descriptions of the BE in FIG. 1.

Optionally, the second apparatus is a UDM network element. Alternatively, the second apparatus is a PCF network element. For details, refer to the descriptions of the FE in FIG. 1.

Based on the foregoing method, the first apparatus and the second apparatus can synchronize the grayscale rule, and identify the grayscale user, so that a test of the first service of the grayscale user can cover the first apparatus and the second apparatus. This implements end-to-end test coverage after grayscale upgrade, improves a possibility of finding a problem in a grayscale test phase, reduces a possibility that a problem occurs in a subsequent rolling upgrade phase, reduces a rollback possibility, and reduces service upgrade costs.

Figure 5:
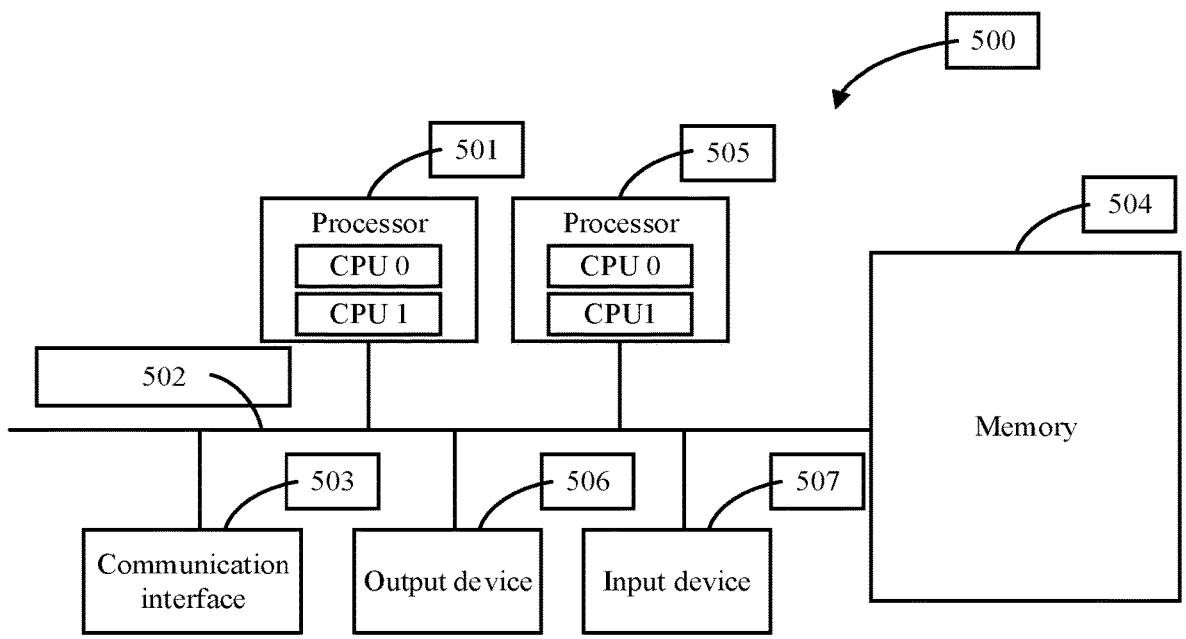
FIG. 5 is a schematic diagram of a structure of a communication apparatus according to an embodiment of this disclosure.

FIG. 5 is a schematic diagram of a structure of a communication apparatus 500 according to an embodiment of this disclosure. The communication apparatus 500 includes one or more processors 501, a communication line 502, and at least one communication interface (that the apparatus includes a communication interface 503 and one processor 501 is only used as an example for description in FIG. 5). Optionally, the communication apparatus 500 may further include a memory 504.

The processor 501 may be a general-purpose central processing unit (CPU), a microprocessor, an application-specific integrated circuit (ASIC), or one or more integrated circuits configured to control program execution of the solutions of this disclosure.

The communication line 502 is configured to connect different components.

The communication interface 503 may be a transceiver module, and is configured to communicate with another device, a communication apparatus, or a communication network such as the Ethernet. For example, the transceiver module may be a network adapter and a fiber switching apparatus. Optionally, the communication interface 503 may alternatively be a transceiver circuit located in the processor 501, and is configured to implement signal input and signal output of the processor.

The memory 504 may be an apparatus with a storage function. For example, the memory 504 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another CD storage, an optical disc storage (including a compact disc, a laser disc, an optical disc, a DIGITAL VERSATILE DISC (DVD), a BLU-RAY disc, or the like), a magnetic storage medium or another magnetic storage device, or any other medium that can be used to carry or store expected program code in a form of an instruction or a data structure and that can be accessed by a computer. However, this is not limited thereto. The memory may exist independently, and is connected to the processor by using the communication line 502. Alternatively, the memory may be integrated with the processor. The memory 504 is configured to store computer-executable instructions for executing the solutions in this disclosure, and execution is controlled by the processor 501. The processor 501 is configured to execute computer execution instructions stored in the memory 504. The computer-executable instructions in this embodiment of this disclosure may also be referred to as application program code. This is not limited in this embodiment of this disclosure.

During specific implementation, in an embodiment, the processor 501 may include one or more CPUs, for example, a CPU 0 and a CPU 1 in FIG. 5.

During specific implementation, in an embodiment, the communication apparatus 500 may include a plurality of processors, for example, the processor 501 and a processor 505 shown in FIG. 5. Each of the processors may be a single-core (single-CPU) processor, or may be a multi-core (multi-CPU) processor. The processor herein may be one or more devices, circuits, and/or processing cores configured to process data (for example, computer program instructions).

The communication apparatus 500 may be a general-purpose apparatus or a dedicated apparatus. For example, the communication apparatus 500 may be a network server, an embedded device, or a device having a similar structure in FIG. 5. A type of the communication apparatus 500 is not limited in this embodiment of this disclosure.

Optionally, the FE in FIG. 2 may be the communication apparatus shown in FIG. 5. The processor 501 in FIG. 5 may support the apparatus 500 in executing a function completed by the FE in FIG. 2. For example, the processor 501 may perform a function of identifying the grayscale user according to the grayscale rule in S103. The communication interface 503 in FIG. 5 may support the apparatus 500 in communicating with another apparatus. For example, the communication interface 503 may support the apparatus 500 in executing the communication process in S103 in FIG. 2.

Optionally, the BE in FIG. 2 may be the communication apparatus shown in FIG. 5. The processor 501 in FIG. 5 may support the apparatus 500 in executing a function completed by the BE in FIG. 2. For example, the processor 501 may perform a function of performing grayscale upgrade in S104, and the processor 501 may further perform a function of performing rolling upgrade in S106. The communication interface 503 in FIG. 5 may support the apparatus 500 in communicating with another apparatus. For example, the communication interface 503 may support the apparatus 500 in executing the communication process in S103 in FIG. 2.

Optionally, the FE and the BE in FIG. 2 may be integrated into the communication apparatus shown in FIG. 5. The processor 501 in FIG. 5 may support the apparatus 500 in executing a function completed by the FE in FIG. 2, and the processor 505 in FIG. 5 may support the apparatus 500 in executing a function completed by the BE in FIG. 2. The communication interface 503 in FIG. 5 may support the apparatus 500 in communicating with another apparatus.

It may be understood that, in the foregoing embodiments, the method and/or the step that are/is implemented by the FE or the BE may be implemented by a chip system that implements a function of the FE or the BE.

Figure 6:
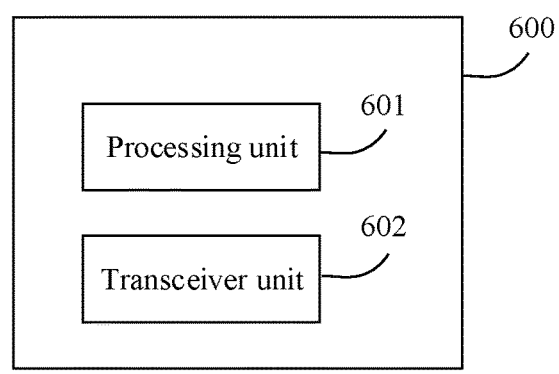
FIG. 6 is a schematic diagram of a structure of another communication apparatus according to an embodiment of this disclosure.

FIG. 6 shows a communication apparatus according to an embodiment of this disclosure. In this embodiment of this disclosure, the communication apparatus may be divided into functional units based on the foregoing method embodiment. For example, functional units may be obtained through division based on corresponding functions, or two or more units integrated into one processing module. The foregoing integrated unit may be implemented in a form of hardware, or may be implemented in a form of a software functional module. It should be noted that, in this embodiment of this disclosure, division into the units is an example, and is merely a logical function division. In actual implementation, another division manner may be used.

FIG. 6 is a schematic diagram of a structure of a communication apparatus 600 according to an embodiment of this disclosure. The communication apparatus 600 includes a processing unit 601 and a transceiver unit 602.

Optionally, the FE in FIG. 2 may be the communication apparatus shown in FIG. 6. The processing unit 601 in FIG. 6 may support the apparatus 600 in executing a function completed by the FE in FIG. 2. For example, the processing unit 601 may perform a function of identifying the grayscale user according to the grayscale rule in S103. The transceiver unit 602 in FIG. 6 may support the apparatus 600 in communicating with another apparatus. For example, the transceiver unit 602 may support the apparatus 600 in executing the communication process in S103 in FIG. 2.

Optionally, the BE in FIG. 2 may be the communication apparatus shown in FIG. 6. The processing unit 601 in FIG. 6 may support the apparatus 600 in executing a function completed by the BE in FIG. 2. For example, the processing unit 601 may perform a function of performing grayscale upgrade in S104, and the processing unit 601 may further perform a function of performing rolling upgrade in S106. The transceiver unit 602 in FIG. 6 may support the apparatus 600 in communicating with another apparatus. For example, the transceiver unit 602 may support the apparatus 600 in executing the communication process in S103 in FIG. 2.

Optionally, the FE and the BE in FIG. 2 may be integrated into the communication apparatus shown in FIG. 6.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

What is claimed is:

1. A method comprising:
adding, by a first apparatus, a first node to the first apparatus that comprises at least a second node, wherein the first apparatus is configured to store and manage service-related data, and wherein the first node is configured to perform a grayscale upgrade on a first service;
configuring, by the first apparatus, a grayscale rule;
identifying, by the first apparatus and according to the grayscale rule, a grayscale user to test the first service;
sending, by the first apparatus to a second apparatus, the grayscale rule, wherein the second apparatus is a front-end apparatus of the first apparatus;
performing, by the first node in the first apparatus, the grayscale upgrade on the first service of the grayscale user;
testing, by the first node and after the grayscale upgrade, the first service of the grayscale user on the second apparatus, wherein the testing comprises: receiving, from the second apparatus, a service request of a later-version application; identifying, according to the grayscale rule, the grayscale user corresponding to the service request; forwarding the service request to the first node; processing the service request by the first node; and feeding back, based on the processing, a response message from the first node to the second apparatus; and
performing, after testing by the first node the first service succeeds, a rolling upgrade of the first service including on the second node in the first apparatus, wherein the rolling upgrade comprises performing a service upgrade on one or more nodes in the first apparatus each at a time and then adding each node on which upgrade is completed to a production environment, and wherein the first node and the second node are virtual machines or containers in the first apparatus.

2. The method of claim 1, further comprising deleting, by the first apparatus, the first node from the first apparatus.

3. The method of claim 2, wherein before performing the grayscale upgrade, the method further comprises copying, by the first node, first data of the grayscale user to the first node.

4. The method of claim 3, wherein before deleting the first node, the method further comprises synchronizing, by the first node to an original node, the first data on the first node, and wherein the original node comprises the first data before copying the first data to the first node.

5. The method of claim 1, wherein the second node is a provisioning gateway (PGW) container, a routing switch unit (RSU) container, or a non-newly added docker in docker (DID) container.

6. The method of claim 1, wherein the first node is a docker in docker (DID) container or a process identifier (PID) container.

7. The method of claim 1, further comprising further identifying, by a load balancing (LB) node of the first apparatus, the grayscale user.

8. The method of claim 1, wherein the first apparatus is a unified data repository (UDR).

9. The method of claim 1, wherein the second apparatus is a unified data management (UDM) network element or a policy control function (PCF) network element.

10. The method of claim 1, further comprising:
receiving, by the second apparatus, the grayscale rule from the first apparatus; and
identifying, by the second apparatus according to the grayscale rule, the grayscale user or a second grayscale user to test the first service.

11. The method of claim 10, further comprising allowing, by the second apparatus, the grayscale user to access a later-version application that obtains data of the first service from the first apparatus.

12. A communication apparatus comprising:
a memory configured to store instructions; and
one or more processors configured to read instructions from the memory, when executed by the one or more processors, the instructions cause the communication apparatus to be configured to:
add a first node to a back end of the communication apparatus that comprises at least a second node, wherein the back end is configured to store and manage service-related data, and wherein the first node is configured to perform a grayscale upgrade on a first service;
configure a grayscale rule;
identify, according to the grayscale rule, a grayscale user to test the first service;
send, to a front end of the communication apparatus, the grayscale rule;
perform, using the first node, the grayscale upgrade on the first service of the grayscale user;
test, by the first node and after the grayscale upgrade, the first service of the grayscale user on the front end, wherein the test comprises: receive, from the front end, a service request of a later-version application; identify, according to the grayscale rule, the grayscale user corresponding to the service request; forward the service request to the first node; process the service request by the first node; and feed back, based on the processing, a response message from the first node to the front end; and
perform, after testing by the first node the first service succeeds, a rolling upgrade of the first service including on the second node in the back end, wherein the rolling upgrade comprises performing a service upgrade on one or more nodes in the back end each at a time and then adding each node on which upgrade is completed to a production environment, and wherein the first node and the second node are virtual machines or containers in the communication apparatus.

13. The communication apparatus of claim 12, wherein when executed by the one or more processors, the instructions further cause the communication apparatus to be configured to:

before performing the grayscale upgrade, copy, using the first node, first data of the grayscale user to the first node; and
delete the first node from the back end.

14. The communication apparatus of claim 12, wherein when executed by the one or more processors, the instructions further cause the communication apparatus to be configured to before deleting the first node, synchronize, using the first node to an original node, first data on the first node, and wherein the original node comprises the first data before copying the first data to the first node.

15. The communication apparatus of claim 12, wherein the first node is a docker in docker (DID) container or a process identifier (PID) container, and wherein the second node is a provisioning gateway (PGW) container, a routing switch unit (RSU) container, or a non-newly added DID container.

16. The communication apparatus of claim 12, wherein when executed by the one or more processors, the instructions further cause the communication apparatus to be configured to:
receive, at the front end, the grayscale rule from the back end; and
identify, according to the grayscale rule, the grayscale user or a second grayscale user to test the first service.

17. The communication apparatus of claim 12, wherein the back end is a unified data repository (UDR), and wherein the front end is a unified data management (UDM) network element or a policy control function (PCF) network element.

18. A communication system comprising:
a first communication apparatus comprising:
a first memory configured to store first instructions;
one or more first processors configured to read the first instructions from the first memory, wherein when executed by the one or more first processors, the first instructions cause the first communication apparatus to be configured to: add a first node to the first communication apparatus that comprises at least a second node, wherein the first communication apparatus is configured to store and manage service-related data, and wherein the first node is configured to perform a grayscale upgrade on a first service;
configure a grayscale rule;
identify, according to the grayscale rule, a grayscale user to test the first service; send the grayscale rule;
perform, using the first node, the grayscale upgrade on the first service of the grayscale user;
test, by the first node and after the grayscale upgrade, the first service of the grayscale user on a second communication apparatus, wherein the test comprises: receive, from a front end, a service request of a later-version application; identify, according to the grayscale rule, the grayscale user corresponding to the service request; forward the service request to the first node; process the service request by the first node; and feed back, based on the processing, a response message from the first node to the front end; and
perform, after testing by the first node the first service succeeds, a rolling upgrade of the first service including on the second node in the first communication apparatus, wherein the rolling upgrade comprises performing a service upgrade on one or more nodes in the first communication apparatus each at a time and then adding each node on which upgrade is completed to a production environment, and wherein the first node and the second node are virtual machines or containers in the first communication apparatus; and the second communication apparatus coupled to the first communication apparatus and comprising:

a second memory configured to store second instructions; and one or more second processors configured to read the second instructions from the second memory, wherein when executed by the one or more second processors, the second instructions cause the second communication apparatus to be configured to:

receive, from first communication apparatus, the grayscale rule, wherein the second communication apparatus is a front-end apparatus of the first communication apparatus; and identify, according to the grayscale rule, the grayscale user to test the first service on the grayscale user.

* * * * *